June 11, 1957 W. UMBDENSTOCK 2,795,091
MULTI-SPIRAL GRINDING FIXTURE
Filed April 30, 1956 4 Sheets-Sheet 1
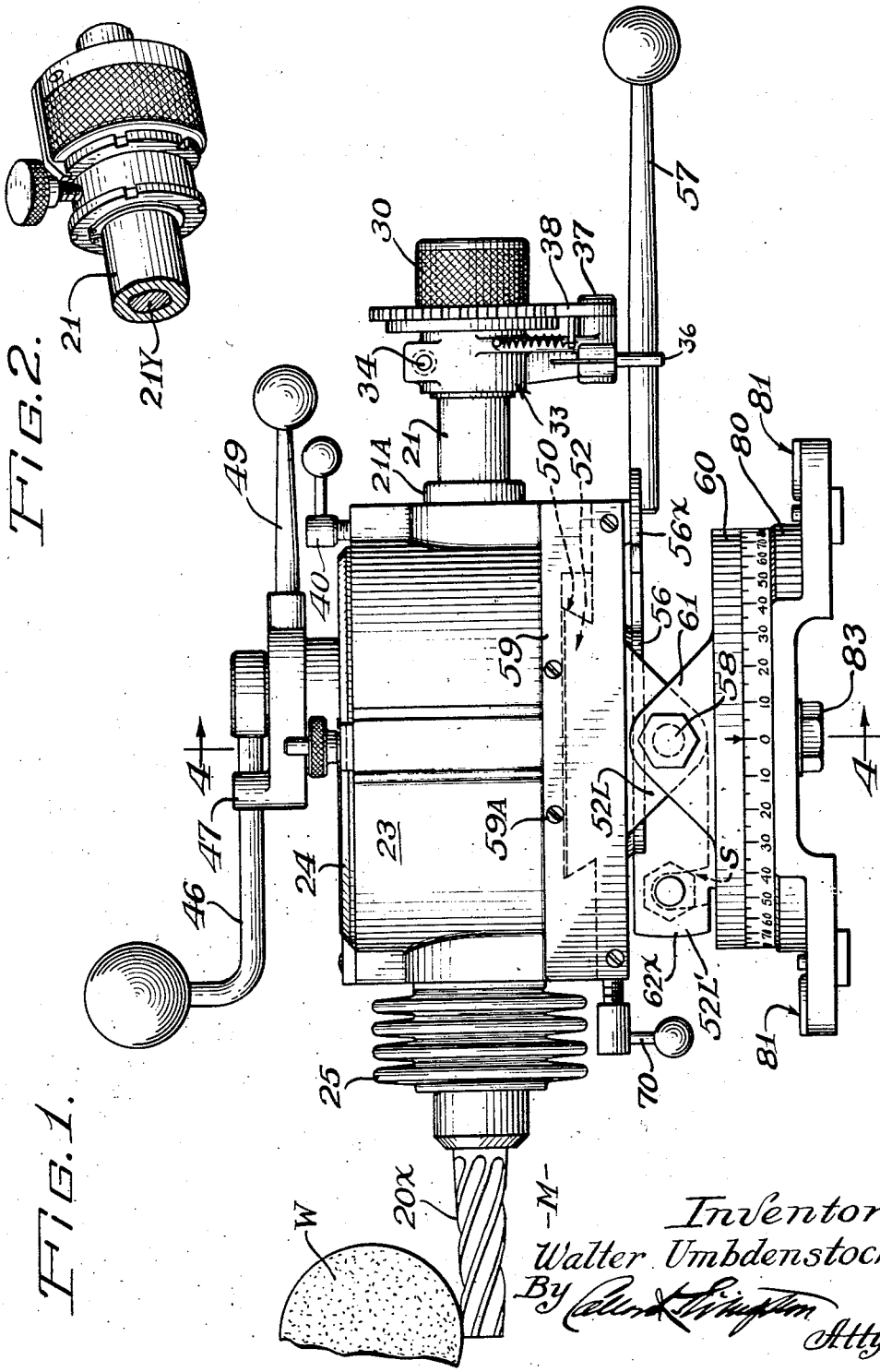
Inventor:
Walter Umbdenstock Inventor:
Walter Umbdenstock

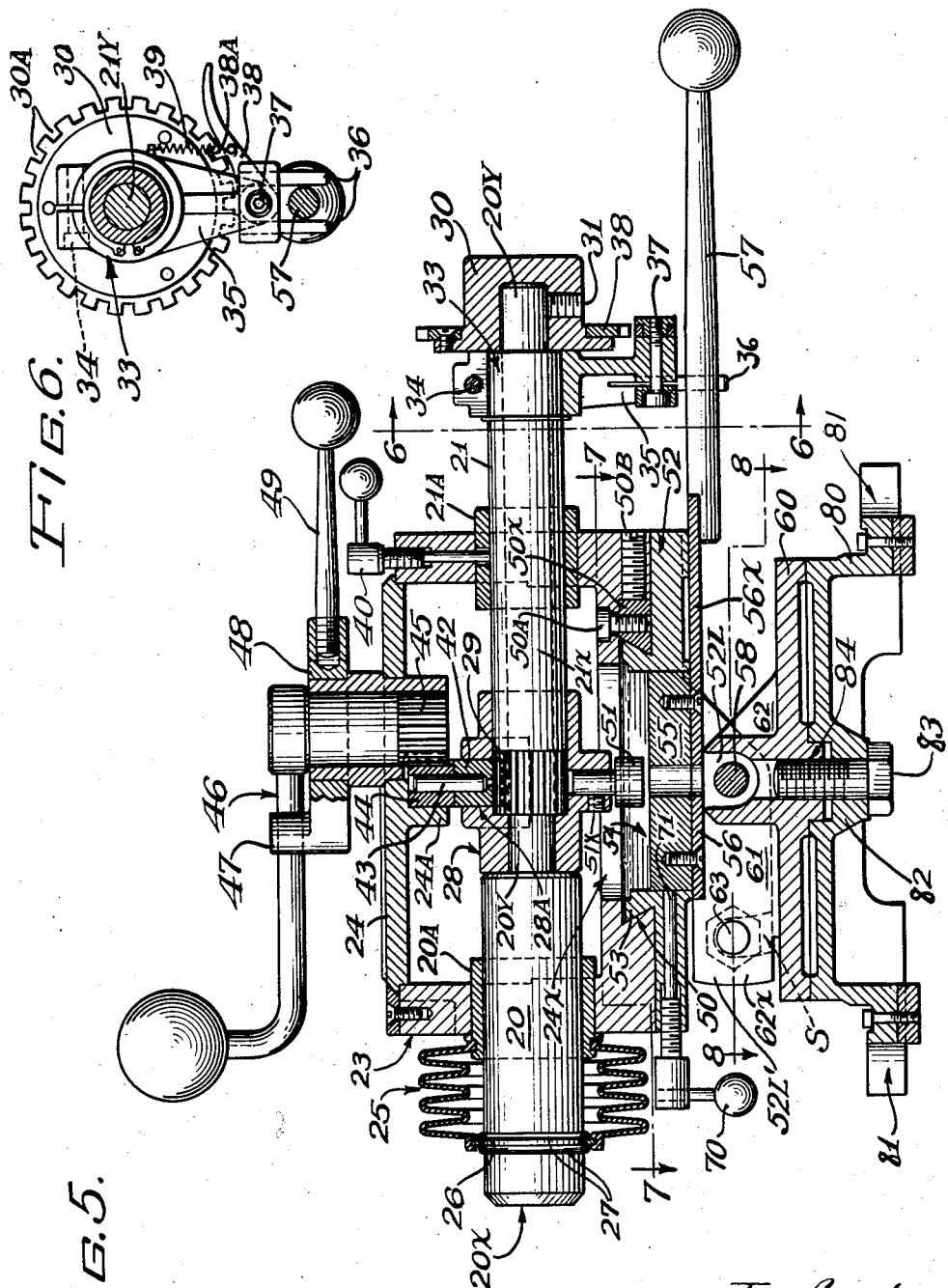

June 11, 1957   W. UMBDENSTOCK   2,795,091
MULTI-SPIRAL GRINDING FIXTURE
Filed April 30, 1956   4 Sheets-Sheet 4

Inventor:
Walter Umbdenstock
By
Atty.

2,795,091
Patented June 11, 1957

2,795,091

MULTI-SPIRAL GRINDING FIXTURE

Walter Umbdenstock, Chicago, Ill., assignor of one-half to Charles T. Breitenstein, Chicago, Ill.

Application April 30, 1956, Serial No. 581,521

8 Claims. (Cl. 51—225)

This invention pertains to spiral-motion mechanisms and motion-compounding devices for use in grinding metal-cutting tools and in various milling operations requiring taper, spiral-milling, radial-relieving, and in grinding form-cutters, and like operations.

One of the broader objects of the improvements is the provision of a relatively small and inexpensive grinding machine which has compound-motion means for selectively augmenting the complex motions of a work spindle and to extend the range and types of motion thereof, and enlarge the grinding and forming capabilities thereof, and make it possible to perform certain operations heretofore unavailable, and others available only on much more complex and costly machines.

A further object is the provision of improvements in the types of spiral grinding machine shown in my U. S. Patent No. 2,375,052 and my copending application Serial No. 492,282, with particular respect to the provision of a simple subbase interdrive means between the latter and parts of a subbase mechanism so as to produce selectively variable translatory movements of the entire spindle and spiral motion means, any of which are accurately controlled functions of both the angular and linear movements of said spindle.

A more specific object is the provision of a simple and compact mechanism for deriving a plurality of motion-components from a spirally-movable work spindle and converting the same into translatory displacements applied to the spindle in addition to, and as selectively variable functions of, the basic rotative and axially shifting displacements thereof which produce its basic spiral action, whereby to further selectively compound the possible kinds, directions, and magnitudes of movement of the work spindle, so that many additional types of grinding, forming, and milling operations become possible with an easily-operated and inexpensive machine-tool fixture which would otherwise have been possible ordinarily only on one of the larger types of grinding machine involving much more complicated mechanisms and controls.

More detailed objects, advantages, and aspects of novelty and utility inherent in the disclosed improvements will be pointed out hereinafter in the appended claims and the specification of a preferred embodiment of the invention as disclosed in view of the annexed drawings in which:

Fig. 1 is a side elevation of the new fixture;

Fig. 2 is a fragmentary perspective detail of a modified form of indexing and selecting knob;

Fig. 5 is a longitudinal vertical section taken along lines 5—5 of Fig. 3;

Fig. 6 is a transverse sectional detail at lines 6—6 of Fig. 5 looking toward the indexing means;

Figure 3:
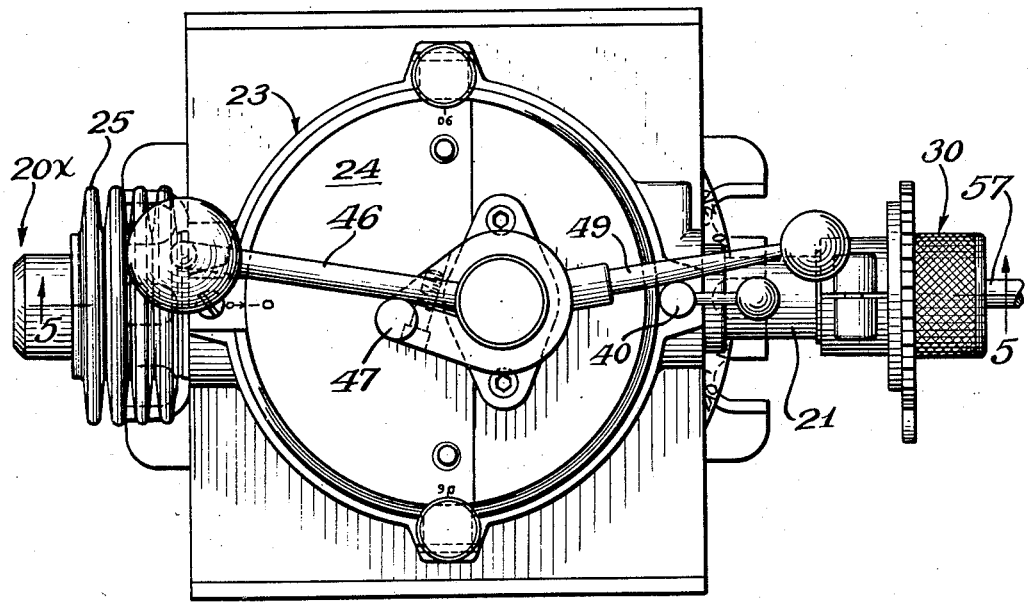
Fig. 3 is a top plan view of the fixture.

Certain portions of the presently described grinding fixture are quite similar to parts of the device disclosed in my co-pending application Serial No. 492,282, and accordingly, the present description may refer only briefly to some of the detailed constructions found also in the antecedent application.

The work spindle consists of two separable spindle sections 20, 21 (Fig. 5) respectively carried in front and rear bushings 20A and 21A fixed in a cylindrical housing or turret head 23 fitted with a removable and rotatable dial plate and cover 24.

The front spindle section 20 carries at its outside extremity a chuck 20X which is provided with a flexible bellows type protective boot 25 seized upon a slip ring 26 which runs free on the chuck between a pair of spring guard rings 27 gripping the chuck. The inner throat of this boot snugly grips a groove in the bushing 20A.

At the inner end of the chuck spindle 20 is a reduced shaft portion 20Y journalled in a casting constituting a rack carrier 28 (Fig. 4 also), this shaft part continuing on through a driven spindle pinion 29 housed within said casting, thence into and through the tubular rearward or indexing section 21 of this composite spindle structure to terminate interiorly of an index knob 30 which is affixed thereto by set screw 31 (see Fig. 6 also).

Carried on the rearmost index portion of the spindle (Figs. 5 and 6) is a clamp yoke 33 having at its top a screw clamp 34 and at its bottom a driving yoke 35, including spaced yoke pins 36 for straddling a lever, to be more fully described hereafter.

On the pendent part of the yoke 35 beneath the index knob is the pivotal mounting 37 for an index dog 38 urged toward the index knob by spring 39 to thrust its detent 38A between indexing teeth 30A on the knob. By releasing set screw 31 index knob 30 can be removed, and spindle 20 and sleeve pinion 29 can be withdrawn from the housing.

Slidably seated in a lateral groove 28A in the lower rack carrier 28 is a spindle rack 42 meshing with the sleeve pinion 29, while mounted above said rack is an upper or pitch rack 44 slidable in an upper guide track 24A on the underside of the dial cover, said pitch rack being pivotally conjoined to the lower rack by a coupling pin 43, and having teeth in its side in mesh with a crank pinion 45 fixed on the spindle of hand crank 46, which is carried in a bushing secured in the dial cover 24. An adjustable stop 47 is clamped by screw collar 48 on the bushing and is fitted with a ball-handled locking screw 49.

The general construction and operation of the fixture, as described thus far, is closely analogous in part to the spiral grinding fixture disclosed in my aforesaid co-pending application; and at this juncture it becomes desirable to review briefly the general operation of both devices to facilitate understanding of the improvements hereinafter to be set forth.

Fundamentally, both mechanisms produce simple and compound motion of the work spindle and its chuck, namely: simple rotary motion; simple linear motion; or a selectively variable combination of both movements resulting in various spiral displacements.

Figure 4:
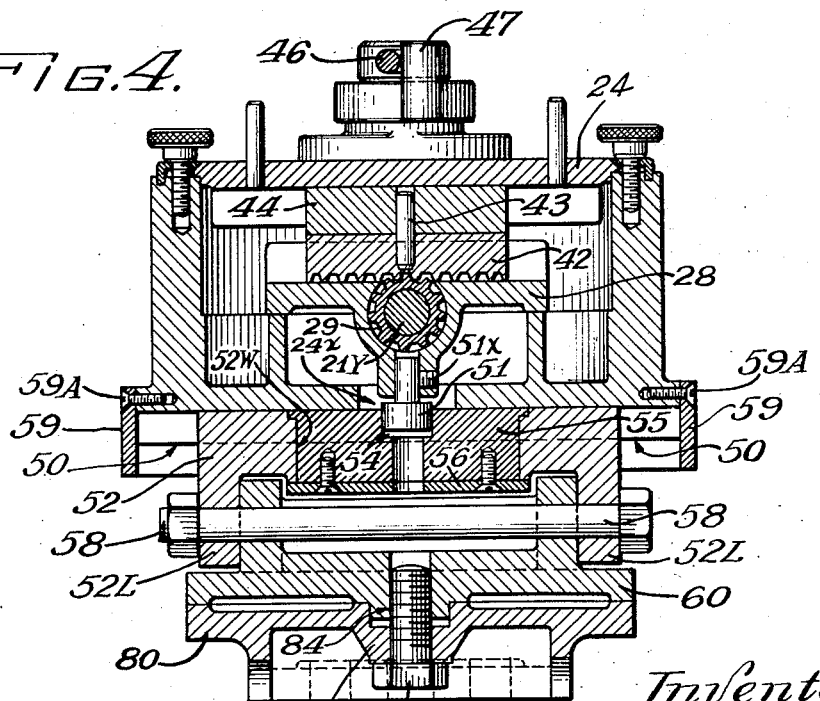
Fig. 4 is a vertical transverse section looking in the direction of lines 4—4 of Fig. 1.

The type of motion produced depends upon the setting of the cover dial 24 and the resultant angular position of the upper rack track 24A, and hence the direction of reciprocation of the upper pitch rack 44; when the latter moves normally crosswise of the spindle axis (e. g. as viewed in Fig. 4) the operation of the crank 46 produces only rotary motion of the spindle; or, if the dial cover is turned 90° from the setting of Figs. 3, 4, and 5, the upper rack will move parallel to the spindle axis and hence produce only linear spindle movement.

Setting of the cover dial at positions between the limiting 90° settings, just referred to, will pitch the upper rack at some desired angle to the spindle axis, and crank actuation will then produce both rotary and linear, or resultantly spiral motion in the spindle.

Actually, the angular range of the dial 24 is 180°, because the same pitch angle can be selected on opposite sides of the spindle axis for right- or left-hand rotation.

The utility of the foregoing range of selective movements of the work spindle is important in grinding, dressing, and forming many types of cutting tools, including such things as step drills, end mills, counterbores, and the like.

The presently disclosed improvements provide means for extending the range of selective movements of the described fixture in order to render the latter capable of performing many of the grinding operations possible on larger and more costly machine tools, such as that described in my U. S. Patent No. 2,479,281, as well as some additional operations which are not possible on the large power-driven grinders.

To this end, the described spiral grinding fixture is provided with a special compound subbase structure affording additional degrees of movement and control of the spindle and hence the work piece carried thereby, together with a supplemental angular interdrive mechanism for transferring actuating forces from the pitch rack means 29, 43, 44, 45 in the turret head, to certain parts of the subbase structure, in the manner and by the means now to appear.

As seen in Fig. 5, the turret head 23 of the new fixture has a gib track 50 formed on the underside of its floor, one gib flange 50X being removably positioned by bolts 50A (Fig. 5) against a gib plate by set screw 50B to lock the turret head against displacement in certain types of work. Disposed in said floor centrally of the gib track is an elongated opening 24X through which depends a drive roller 51 fixed as at 51X in a pendent boss on the rack carrier casting 28 (see also Fig. 4).

Carried on the underside of the turret (as in Figs. 4 and 5) is a gib plate 52, the flanges 53 of which slidably fit in the track 50; and there is formed centrally in this gib plate a circular well 52W lying beneath the elongated roller slot 24X in the floor of the turret head thereabove (Fig. 4 also). Rotatably seated in well 52W is a cylindrical pitch plug 55 having a flanged crown and secured in the well by a removable bottom plate 56 provided with a rearwardly extended part 56X (Figs. 1 and 5), to which is attached a ball-handled throw lever 57.

Removably secured by screws 59A to opposite sides of the bottom of the turret head, and flanking the two ends of the aforesaid gib track, are guard plates 59 (Figs. 1 and 4), removal of either of which permits sliding the head entirely off the gib plate for separation from the entire subbase for use in other applications where the range of complex motions of the whole fixture are not required.

Reverting to Figs. 4 and 7 and the pitch plug 55, the latter has extending across the top thereof a long roller groove 54 in which roller 51 works in a manner depending upon the angular setting of the plug 55, as will more fully appear hereinafter.

Figure 8:
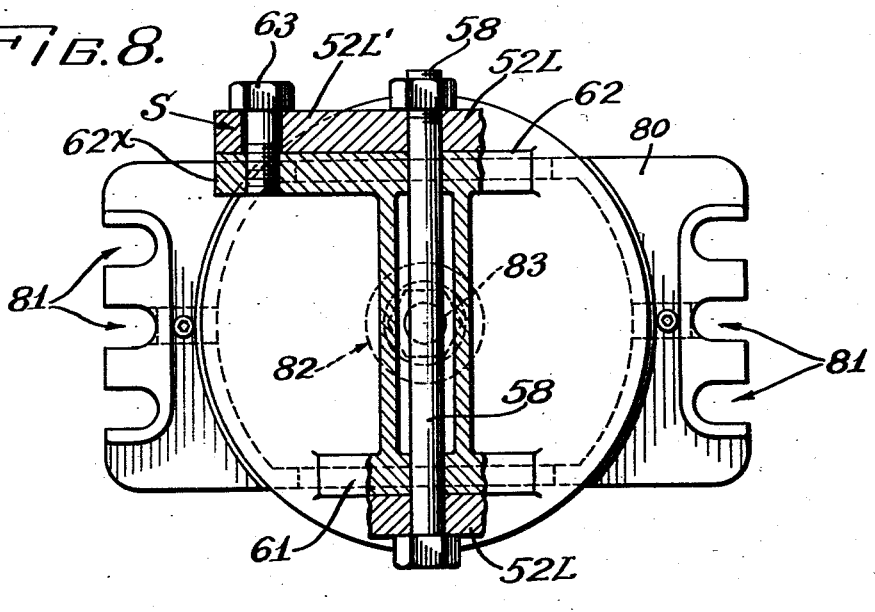
Fig. 8 is another horizontal section looking down along lines 8—8 of Fig. 5.

Gib plate 52 is completed by the provision of a pair of integral trunnion legs 52L (Fig. 4) through which are passed a bolt serving as a trunnion pin 58. One of the aforesaid trunnion legs 52L has a lateral extension 52L' (Figs. 1 and 8) which is provided with an arcuate swing slot —S—, the purpose of which will presently appear.

As viewed particularly in Figs. 1 and 5, the grinding fixture is supported upon a swivel plate 60 having a pair of upstanding posts 61, 62, in which the trunnion pin 58 is seated; and the post 62 has an extension 62X (Figs. 5 and 8) into which is threaded a lock bolt 63 passing through the arcuate slot —S— in the trunnion leg of the swivel plate, by means of which the latter may be locked in various tilted positions relative to the axis of pin 58.

Lever 57, and more particularly the pitch plug 55 with which it is connected, may be secured in adjusted positions by a long lock screw 70, 71, threaded into the gib plate and extending to the well 52W, as in Fig. 5.

Completing the subbase structure is a base and bedding plate 80 seen in Figs. 1 and 5 and having a series of marginal slots 81 (Fig. 8) along opposite edges to receive a hold-down or bed bolts, and also having a central boss 82 into which passes a swivel and locking bolt 83 threadable into a bore 84 in the swivel plate.

The bedding plate 80 is utilized as a base for the fixture and as a means for seating the same in the beds of various machine tools such as milling machines, grinders, and the like.

In the use of the new fixture, the possible movements which can be given to a work piece carried in the chuck are almost limitless, and the invention places in the hands of the skilled toolmaker a small, relatively inexpensive grinding machine of heretofore unavailable capabilities in such size.

The infinite motions of the work piece in one plane make possible dressing, grinding, and backing off of form tools, step drills, recessing tools, hollow and tapered mills, trepanning tools, and a great variety of work involving compound angles.

By way of one simple example, a taper may be provided on an end mill of given pitch and lead by setting the turret plate 24 at the proper angle for the spiral lead on the blank or mill, if being dressed, and also setting the subbase pitch member 55 at an angle to yield the required amount of taper as a co-function of the required spiral motion of the work spindle and chucked mill, according to empirical trigonometrical formulae and data supplied with each machine depending upon the type of work which will be most commonly handled.

In such operation, the yoke means 35, 36, etc. is not used and will be removed, and the index means shown in Fig. 2 will be substituted and utilized in accordance with the number of flutes to be ground on the particular milling bit secured in the chuck, as in Fig. 1; and thereupon, a proper grinding wheel —W— being assumed in position relative to the chucked tool, the lever 57 will be set at an angle which will produce the desired taper, and the crank 46 will be oscillated for the required number of passes and index changes until each spiral flute has been ground with the required taper.

In addition to the basic spiral movement which will be imparted to the end mill —M—, according to the required pitch and lead for which the head or turret plate 24 has been set, as aforesaid, the subbase mechanism will displace the entire turret head and spindle assembly laterally at a predetermined rate concomitantly with, and as a result of, the rotary and linear displacements of the spindle parts 21, which motions are transmitted because of the angular setting of the lever 57, and the corresponding angular position of the pitch slot 54 occasioned thereby.

Figure 7:
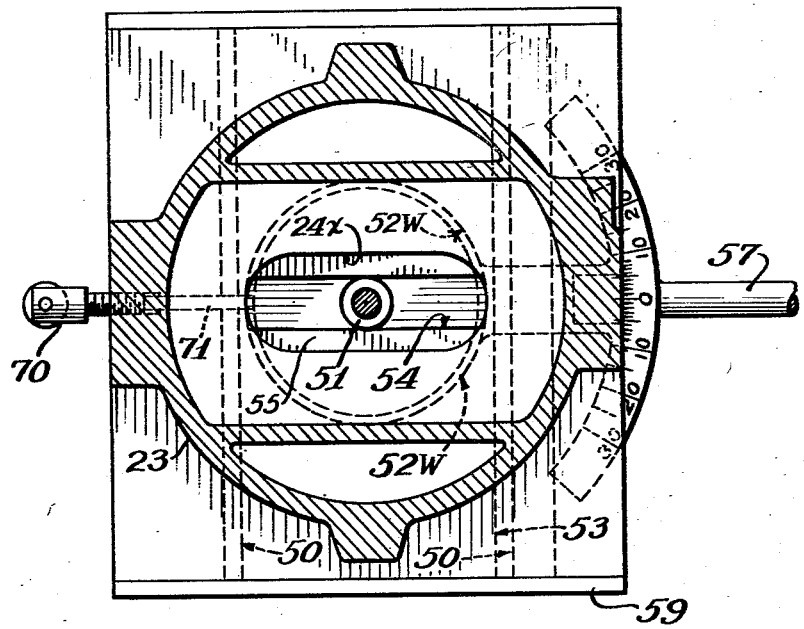
Fig. 7 is a horizontal section looking down along lines 7—7 of Fig. 5.

When the subbase lever 57 is in mid-position or 0°, the pitch slot 54 is in the position of Fig. 7 and is transverse to the direction of travel of the gib track; therefore at 0° no resultant displacement of the turret head is produced in response to any spindle movement. However, other angular settings of the lever 57 to right or left of 0° will produce a displacement of the head of correspondingly increasing magnitude as a function of the linear displacements of the main work spindle.

To utilize the radial relief feature to form-relieve a milling cutter, the driving yoke 35—36 and associated indexing means is fixed on the spindle sleeve 21, as in Figs. 1 and 5, and the turret plate 24 is set at 90°, which will produce only linear or in-and-out movement of the work spindle. The ball lock 70 is released and with the milling cutter or other special shape in the work chuck and properly started in relation to a suitable grinding wheel (analogous to the showing of Fig. 1) the operator actuates the lever 57 by oscillating same in the desired amplitude, this motion being transmitted through the yoke interdrive means 35, 36 to rock the spindle sleeve 21 (Fig. 5) thereby turning the sleeve pinion 29 and driving the gear rack 42, with the further result that the entire turret head now slides on gib track 53 at a progressively changing rate because the cam roller 51 is being uniformly displaced, but simultaneously (owing to movement of lever 57) the pitch plug 55 is being turned, and therefore the pitch track in which the roller is acting is likewise being turned into a progressively increasing (or decreasing) angle and, in consequence, the resulting sliding movement of the entire turret head gives a radial relief along the length of the form (i. e. along the face of a milling tooth), depending upon the amplitude of the swing of lever 57.

The aforesaid "form-relieving" action is the principal use and function of the yoke interdrive means 33, 36, 57 in coacting with the translatory subbase structure.

It is also possible to drive the lever 57 and associated pitch block means by oscillation of the crank 46 (and vice versa) to produce resultant motions of the spindle, in addition to the aforesaid linear or in-and-out motion (when the dial plate 24 is set at 90°) by setting the dial plate 24 at small angles different from 90°. Conversely, manipulation of the lever 57 under the last-mentioned small-angle settings will produce the same spindle motion as when the crank 46 is oscillated, as last above described.

I claim:

1. In a grinding fixture having an axially slidable and rotatable spindle, a pair of pivotally interlinked racks one above another and the upper one constituting a pitch rack which is reciprocable along or crosswise of the second rack, an oscillable crank for reciprocating the pitch rack, and angular adjustable means for predetermining the direction of displacement of the pitch rack relative to the second rack, improvements comprising, namely, additional motion compounding means including: a linearly shifting slide member carrying said fixture for bodily translations at angles to the spindle axis; a pitch swivel having a cam track therein and carrying said shifting slide member and angularly adjustable relative thereto; and a motion-transmitting interdriving member on said rack carrier working in said track to transmit a driving force to the shiftable member and translate the fixture in response to certain movements of the pitch rack, provided the pitch swivel is angularly turned to a position lying between certain limits.

2. Apparatus according to claim 1 further characterized in that a further interdrive means is provided between said spindle and said pitch swivel for shifting the latter angularly in response to angular movements of said spindle, and concomitantly with the aforesaid translatory actions, if any.

3. Apparatus according to claim 2 further characterized in that said further interdrive means includes radial lever means on both the spindle and swivel member and interacting responsive to turning motions of the spindle to change the angular adjustment of the swivel member at a progressively and retrogressively varying rate as a function of the linear angular spiral-motion components of the spindle.

4. In a spiral grinding machine having a spirally-movable spindle and pitch-rack means drivingly cooperable therewith and operable to impart either or both rotative and axially shifting movements thereto, motion-compounding means comprising, to wit: a slide bedded for movements crosswise of said spindle; a swivel member connected to move with said slide and turn in a plane approximately parallel to the plane of movement of the slide; means mounting the spindle and pitch rack means for bodily displacement with the slide, said swivel member being selectively rotatable to various angular settings about a cross axis through the slide and normal to said planes and the axis of the spindle; a first interdrive means including a long slot in the swivel member in the plane of rotation thereof and positionable by turning thereof between limits which are parallel to and transverse to the direction of sliding movement of the slide, together with cam means movable with said pitch rack means and acting in said slot to move the slide as a function of axial movement of the spindle and dependently upon the angular setting of the swivel member; and a further interdrive means including a driving connection between said spindle and said swivel member for changing the angular setting of the latter as another function of movement of the spindle.

5. Mechanism as defined in claim 4 further characterized in that said driving connection for the further interdrive means comprises a radially extended yoke lever on the spindle, and a radially-extended lever projecting axially into the yoke of said yoke lever whereby the appertaining interdrive action may contain either or both the angular and axially linear motion components of the spindle depending on which motions the latter undergoes.

6. A multi-spiral grinding machine comprising: a slide bed; a slide movable on said bed; a swivel plate beneath the bed mounted to turn in a plane parallel to that of the bed and slide thereon and coupled with the slide; means for turning the swivel plate into desired angular settings relative to the slide; a work spindle and means mounting the same for movement with said slide in position for axial and angular displacement transversely of the line of movement of the slide; means including an angularly adjustable pitch rack driving the spindle to turn said spindle and shift the same axially to produce spiral motion thereof; means carried to move with said slide for driving said pitch rack; means providing a driving connection between said pitch rack and said swivel plate to shift the slide concomitantly as a function of axial movement of the spindle; together with means for moving said swivel plate angularly under control of the spindle as a function of either or both angular and linear motion of the latter, whereby selected complex motions may be imparted to said spindle.

7. A multi-spiral grinding fixture comprising: a slide and a bed therefor; a rotatable member mounted to move with the slide and turn about an axis normal to the plane of the slide; a turret head carried by the slide and having a work spindle movable linearly and angularly in a plane approximately parallel to that of said slide; pinion means on the spindle; a first gear rack and carrier means mounting same to drive said pinion means; a second rack pivotably movable with the first rack; means movable with said head for pivoting the second rack adjustably to different angular positions relative to the first rack; manual means movable with the head coacting with the second rack for reciprocating the latter whereby to rotate the spindle or displace the spindle linearly or both depending on the adjustment of the second rack; and interdriving means carried by the carrier means for the second rack and the rotatable member movable with the slide as aforesaid for imparting sliding motion to the latter in certain angular settings of the rotatable member whereby to impart bodily displacement to said turret head simultaneously with certain movements of the spindle.

8. A fixture according to claim 7 further characterized by the provision of further interdriving means carried by part of said spindle and cooperable with lever means connecting with said rotatable member for producing angular movement of one of the spindle or rotatable members in response to angular movement of the other one of said two members provided said members are preset into certain angular positions of adjustment.

References Cited in the file of this patent

UNITED STATES PATENTS

| | | |
|---|---|---|
| 2,375,052 | Umbdenstock | May 1, 1945 |
| 2,471,539 | Parker | May 31, 1949 |
| 2,584,483 | McDonald et al. | Feb. 5, 1952 |
| 2,752,740 | Mouw | July 3, 1956 |